United States Patent
Johnson

(10) Patent No.: US 6,902,327 B1
(45) Date of Patent: Jun. 7, 2005

(54) APPARATUS AND METHOD FOR LASER WELDING A FERRULE TO A FIBER OPTIC CABLE

(75) Inventor: Brian E. Johnson, Farmington, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/731,107

(22) Filed: Dec. 10, 2003

(51) Int. Cl.$^7$ ................................................. G02B 6/38
(52) U.S. Cl. ............................ 385/60; 385/66; 385/72
(58) Field of Search ........................... 385/60, 66, 72, 385/76, 78, 80

(56) References Cited

U.S. PATENT DOCUMENTS

| | | | |
|---|---|---|---|
| 4,767,177 A | * | 8/1988 | Cartier .......................... 385/81 |
| 4,787,695 A | * | 11/1988 | Laor ............................. 385/78 |
| 4,859,827 A | | 8/1989 | Coyle, Jr. et al. |
| 5,268,556 A | | 12/1993 | Coyle, Jr. et al. |
| 5,291,570 A | | 3/1994 | Filgas et al. |
| 6,213,649 B1 | * | 4/2001 | Omiya et al. .................. 385/60 |
| 6,430,061 B1 | | 8/2002 | Grant et al. |
| 6,726,370 B2 | * | 4/2004 | Shimotsu ....................... 385/78 |
| 6,776,534 B2 | * | 8/2004 | Takahashi et al. ............. 385/76 |
| 6,779,931 B2 | * | 8/2004 | Murata et al. ................. 385/98 |

FOREIGN PATENT DOCUMENTS

| | | |
|---|---|---|
| DE | 19529527 C1 | 10/1996 |
| DE | 19919428 C2 | 11/2000 |
| JP | 63216010 | 9/1988 |

* cited by examiner

*Primary Examiner*—Chandrika Prasad
(74) *Attorney, Agent, or Firm*—Daniel R. Edelbrock

(57) ABSTRACT

A ferrule is designed to be laser welded to a fiber optic cable. The ferrule has an inner annular wall and an outer cylindrical surface. Sets of cavities are spaced along the inner annular wall of the ferrule. Each cavity is connected to the outer surface of the ferrule by an open passage. The inner annular wall of the ferrule leads to a narrow channel for receiving a length of exposed core of the cable. The inner annular wall is sized to snugly receive an outer covering of the cable. When a fiber optic cable end is inserted into the ferrule and the exposed core extends through the channel, lasers are directed through the passages and cavities to melt the outer covering of the fiber. The outer covering expands into the cavities and secures the cable within the ferrule when the lasers are removed and the covering cools. The cavities provide an increased bonding surface area.

18 Claims, 4 Drawing Sheets

APPARATUS AND METHOD FOR LASER WELDING A FERRULE TO A FIBER OPTIC CABLE

BACKGROUND OF THE INVENTION

1. Field of the Invention

The invention is directed in general to a method and apparatus for terminating a fiber optic cable, and more specifically to a ferrule that can be laser welded to a fiber optic cable to securely attach the ferrule to a light-transmitting end of the cable.

2. Discussion of Related Art

For attachment to optical connectors and/or alignment with components such as fiber optic transceivers, fiber optic cables typically need to be terminated. Ferrules for fastening light-transmitting ends of the cables to couplers or connectors are attached to the cables in various manners. Laser welding techniques have been employed in the art to facilitate connections. For example, U.S. Pat. No. 4,859,827 discloses a method in which an optical fiber is bonded to a ferrule by an epoxy adhesive. The ferrule is fitted within a sleeve that is used to attach the fiber to an optical coupler. The sleeve is also used to align the fiber within the coupler, so the ferrule has to be immovably fixed within the sleeve. In one embodiment, thinned regions are formed on the sleeve. A laser beam is directed at the thin region to laser weld the sleeve to the ferrule. Another example is provided by German Patent Document DE19919428, published Nov. 23, 2000. A ferrule is selected to be more transparent than a wrapping surrounding an optical waveguide. Because of the transparency, a laser light penetrates the ferrule to weld the ferrule to the wrapping by a through-melt technique.

In U.S. Pat. No. 6,804,439, a method is described for laser welding a plastic ferrule to a plastic-jacketed optical fiber cable. A layer of material absorptive to radiation at a predetermined wavelength is coated on the optical fiber jacket. The ferrule is selected to be substantially transparent to the predetermined wavelength and receives the cable. When a laser irradiates the assembly, the coating material creates a weld pool extending generally equally into the jacket and ferrule to bond the ferrule to the cable.

These various techniques require additional components such as sleeves and adhesives, ferrules with specific light-transmitting characteristics, or additional fusing material to complete the weld and provide a terminated cable for attachment to optical connectors or couplers.

SUMMARY OF THE INVENTION

Accordingly, it is an object of this invention to provide a ferrule that can be directly and securely laser welded to a fiber optic cable end.

Another object of the invention is to enable the laser welding process to occur without restrictions on the transparency of the ferrule and without the need for additional weld material.

A still further object of the invention is to hold the fiber core of the cable end in a manner that leads to easy alignment of the core with a transceiver, additional fiber optic cable end, or other optical component in a mating connector or coupling device.

In carrying out this invention in the illustrative embodiment thereof, a generally cylindrical ferrule is manufactured with a hollow interior surrounded by an inner annular wall of the ferrule. Cavities in a section of the wall are aligned with passages that connect the cavities with the exterior or outside of the ferrule. The ferrule has an insertion end for receiving the end of a fiber optic cable and a connector mating section at the opposite end of the ferrule for aligning a fiber core of the cable with an optical coupling device. This mating section has an interior formed by having the inner annular wall converge to a narrow channel slightly larger in diameter than the fiber core of the cable.

A fiber optic cable has a plastic jacket or covering which is stripped back to expose a predetermined length of a fiber core at an end of the cable. The cable end is inserted into the ferrule. The fiber core extends through the connector mating section in the narrow channel. The narrow channel provides a precise alignment position for the fiber core. A still-jacketed portion of the cable end fits snugly within the sections of the ferrule inner annular wall having the cavities.

Laser beams directed through the passages strike and heat jacket segments adjacent the cavities. The jacket segments melt and expand into the cavities. When the lasers are removed the jacket segments cool. The expanded jacket segments, in interaction with the cavities, securely hold the cable end in the ferrule.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
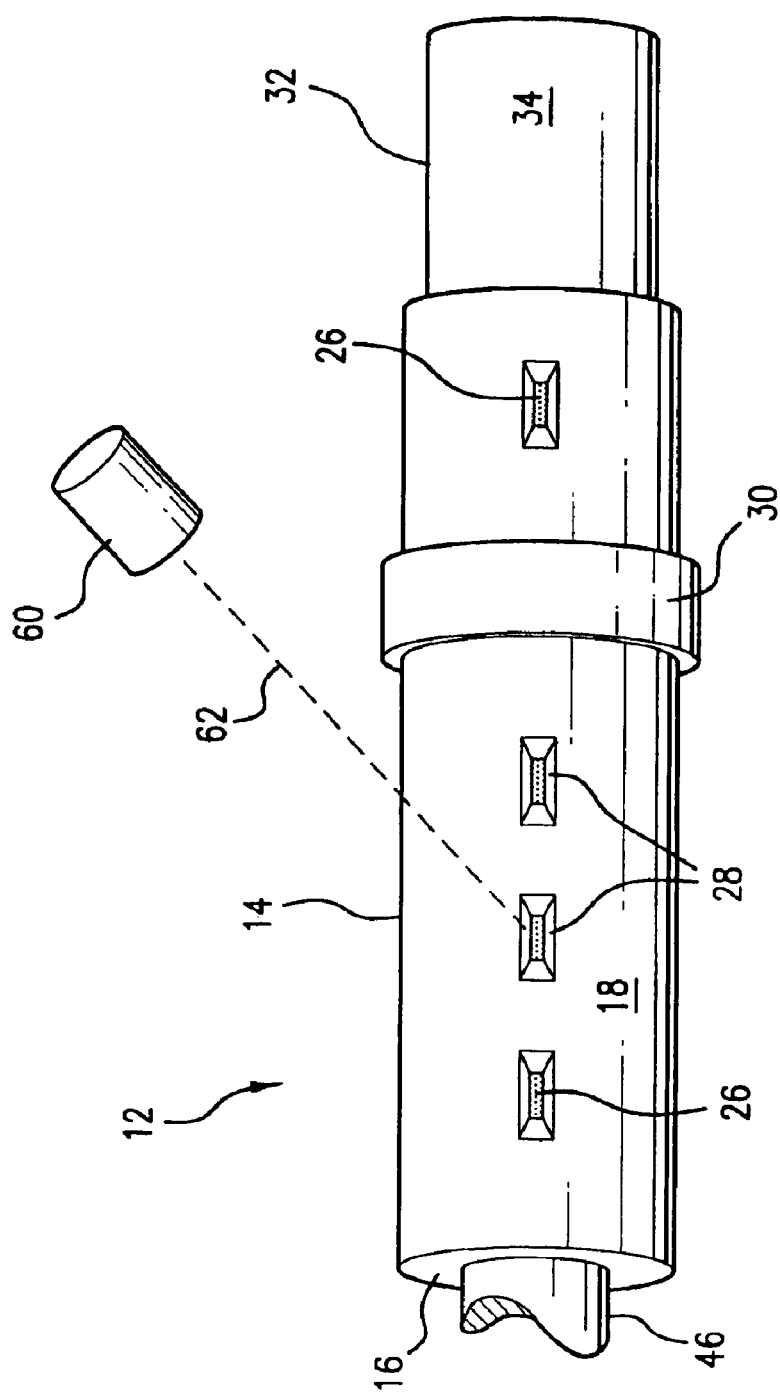
FIG. 1 depicts a ferrule according to the present invention mounted on a fiber optic cable end and a laser device for use in an attachment method.
Figure 2:
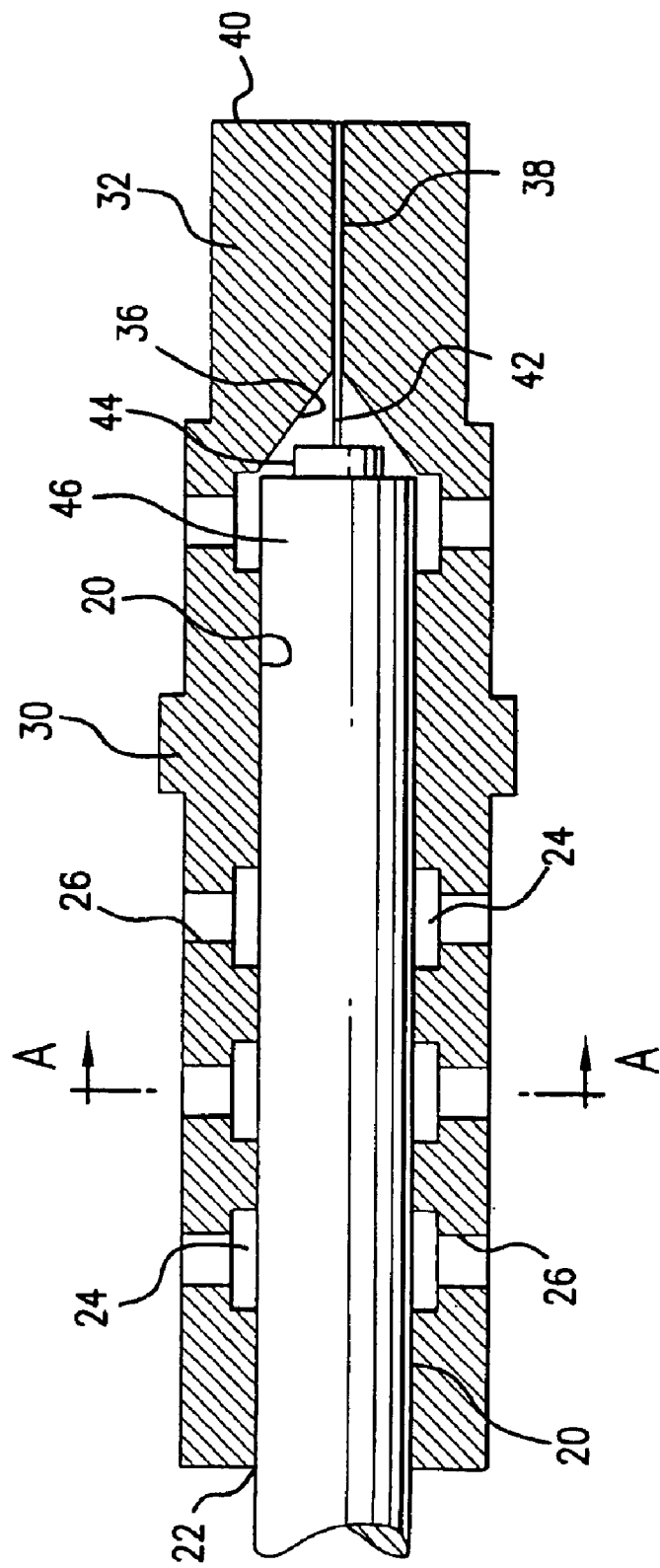
FIG. 2 is a cross-sectional side view of a ferrule with the cable prior to a laser welding step in the attachment method.

Referring now to FIGS. 1 and 2, a ferrule 12 according to the present invention is illustrated. The ferrule is generally cylindrical in shape and is designed for placement around the end of a fiber optic cable. It is molded or otherwise manufactured from a liquid crystal polymer or other suitable thermoplastic material, creating a cylindrical exterior including three main sections.

A first section 14 includes a fiber optic cable insertion end 16, an outer surface 18 and an inner annular wall 20 defining a hollow interior conduit 22. Spaced along the inner annular wall 20 are shaped cavities 24. Passages 26 extend from recesses 28 in the outer surface 18 into communication with the shaped cavities 24. The cavities have a larger cross-sectional area than the passages. The passages 26 are illustrated as rectangular with their long sides extending along the length of the ferrule. The recesses 28 are represented as four short walls converging to the passage openings. This design is meant to optimize operation of a laser directed through the recesses and passages to the cavities 24, but other designs for the recesses and passages are within the scope of the invention. The passages, for example, could simply open to the outer surface 18 of the ferrule without use of the recesses, as suggested by FIG. 2.

A second section comprises a raised, short cylindrical rim 30 surrounding the first section 14. It is located approximately two-thirds of the way along the length of the first section of the ferrule 12 from the cable insertion end 16. The rim is typical of optical ferrules and is used to help hold the ferrule in position in a female connector or other optical coupling device by interacting with shoulder facets or latches of these other devices.

A third section 32 of the ferrule has an outer surface 34 with a smaller outer diameter than the first section. This outer diameter provides a primary alignment feature, based on the outer diameter tolerance when molded, when the third section is inserted into an optical connector or other coupling device. The third section has an inner conical wall 36 that starts within the first section 14 adjacent an end of the first section opposite the cable insertion end 16. The conical wall 36 narrows or converges to a small diameter or narrow channel 38. The small diameter channel 38 extends along the length of the third section to a fiber light output end 40 of the ferrule opposite to the cable insertion end 16 of the ferrule.

FIG. 2 also illustrates a fiber optic cable received within the ferrule 12. The fiber optic cable has a center or central, light-transmitting fiber or core 42 that may be plastic or glass. It is generally surrounded by two or more layers of a plastic material such as Nylon to provide impact and solvent resistance as well as stress relief for the cable, since multiple layers would enhance distribution of bending forces or other stress. This outer jacket or covering could be extruded or otherwise coated on to the fiber core or attached before termination of the fiber. In the cable illustrated, there is an inner jacket or layer 44 and an outer jacket or layer 46.

For use with the ferrule 12 of this invention, the inner and outer jacket layers of the fiber optic cable are removed from adjacent the end of the cable. The optical fiber core 42 is exposed for a specified length depending on the length of the small diameter channel 38 in the third section. When inserted into the ferrule 12 from the insertion end 16, the fiber extends through the narrow channel 38 in the third section to a position flush with the light output end 40 of the ferrule. The inner conical wall 36 helps guide the core into the channel 38. The inner and outer jacket layers are stripped back to a position short of the conical wall so as not to interfere with the core insertion. The diameter of the narrow channel is slightly larger than the fiber core to serve as a means of aligning the fiber core with whatever optical component exists in the coupling device. If the fiber end is not flush with the external face of the third section, the excess would be severed. The cut fiber end would then need to be polished to provide an optical surface. The hollow interior conduit 22 is sized such that the outer jacket or layer 46 of the cable is snugly received in the conduit. In other words, the inner annular wall 20 exerts a somewhat compressive stress on the cable. This ensures that each cavity is separate from, and does not communicate with, every other cavity along the inner annular wall when a cable is inserted in the ferrule.

Figure 5:
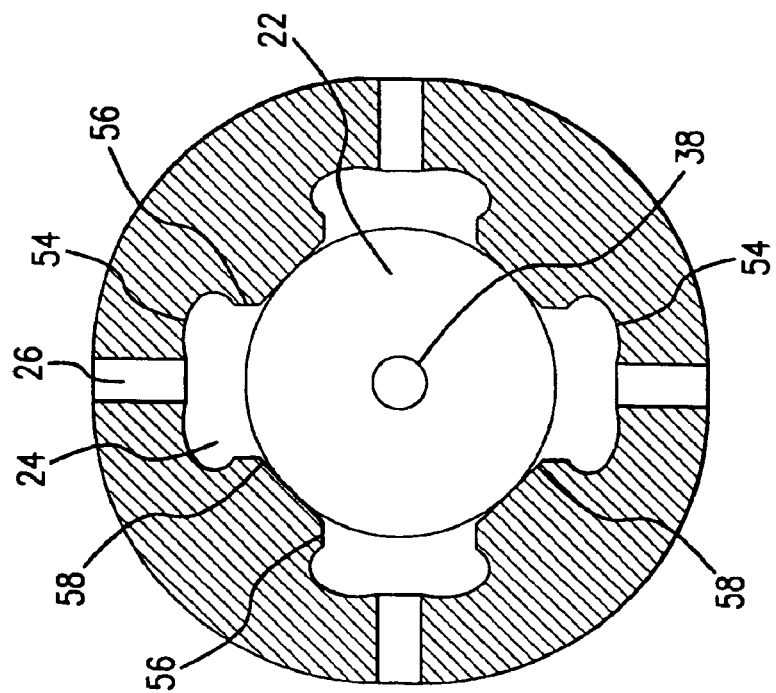
FIG. 5 is a cross-sectional end view of the ferrule similar to FIG. 5 but illustrating an alternative embodiment of the cavity shape.
Figure 4:
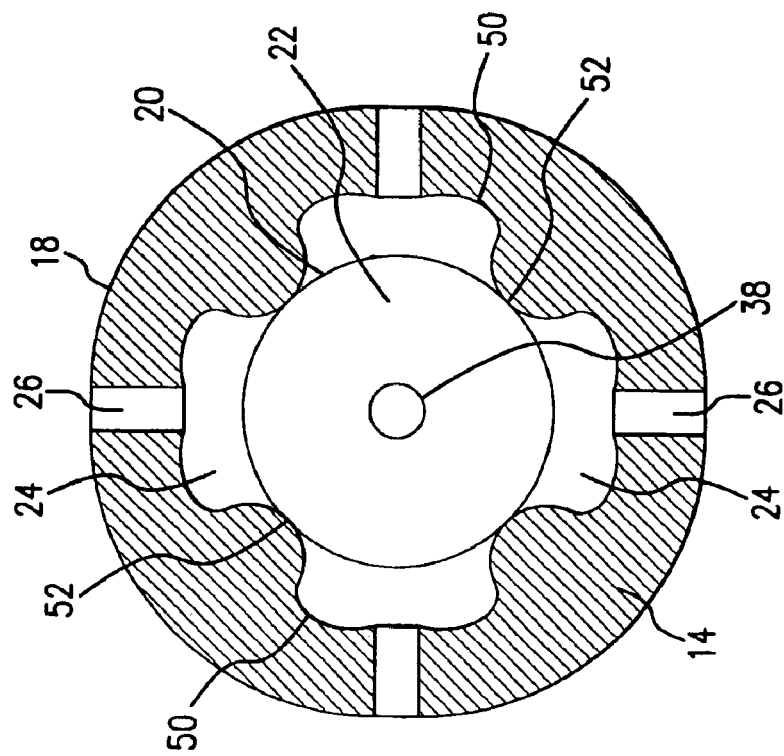
FIG. 4 is a cross-sectional end view of the ferrule taken on section line A—A of FIG. 2, with the cable omitted, to show how internal cavities are shaped.

As illustrated in the cross-sectional end views of FIGS. 4 and 5, there are four cavities at each of the four spaced locations, extending around the inner annular wall 20. This provides multiple sets of cavities spaced along the inner annular wall. There could be more or less sets than illustrated, depending on the required degree of retention force needed for different ferrule and cable sizes and various cable jacket characteristics. Also, under some conditions, a single cavity at one location along the ferrule might provide an acceptable retention force. In the illustrated embodiment, each cavity 24 has its own smaller-size passage 26 connecting the cavity to the outer surface 18 of the first section 14 and exterior of the ferrule.

FIGS. 4 and 5 provide examples of specific cavity shapes. The cavities illustrated in FIG. 4 together form or depict a cross or a four leaf clover representation, with each cavity or leaf element 50 joined to the other by a rounded edge 52. In FIG. 5, the cavity shape depicted is more complex. Each cavity has a semi-oval shaped element 54 adjacent the passage. The elements 54 are each connected by a short straight edge 56 parallel to the passage 26 and longer inclined surfaces or edges 58 extending between the short straight edges. The rounded edges 52 of the FIG. 4 embodiment and the inclined surfaces 58 of the FIG. 5 embodiment extend inward to the diameter of the inner annular wall 20. For this reason, when a fiber optic cable is inserted into the ferrule, the rounded edges 52 or the inclined surfaces 58 would contact the outer layer of the cable and ensure separation of the cavities. These edges or surfaces along with the inner annular wall 20 could also be sized to exert increased compressive stress on the outer jacket layer. This would expose some added jacket material in the area of the cavities. The cavity representations are meant to be examples of depressions in the inner annular wall of the ferrule that efficiently perform the function of the invention. Other cavity shapes that meet performance requirements are certainly possible and well within the scope of this invention.

Figure 3:
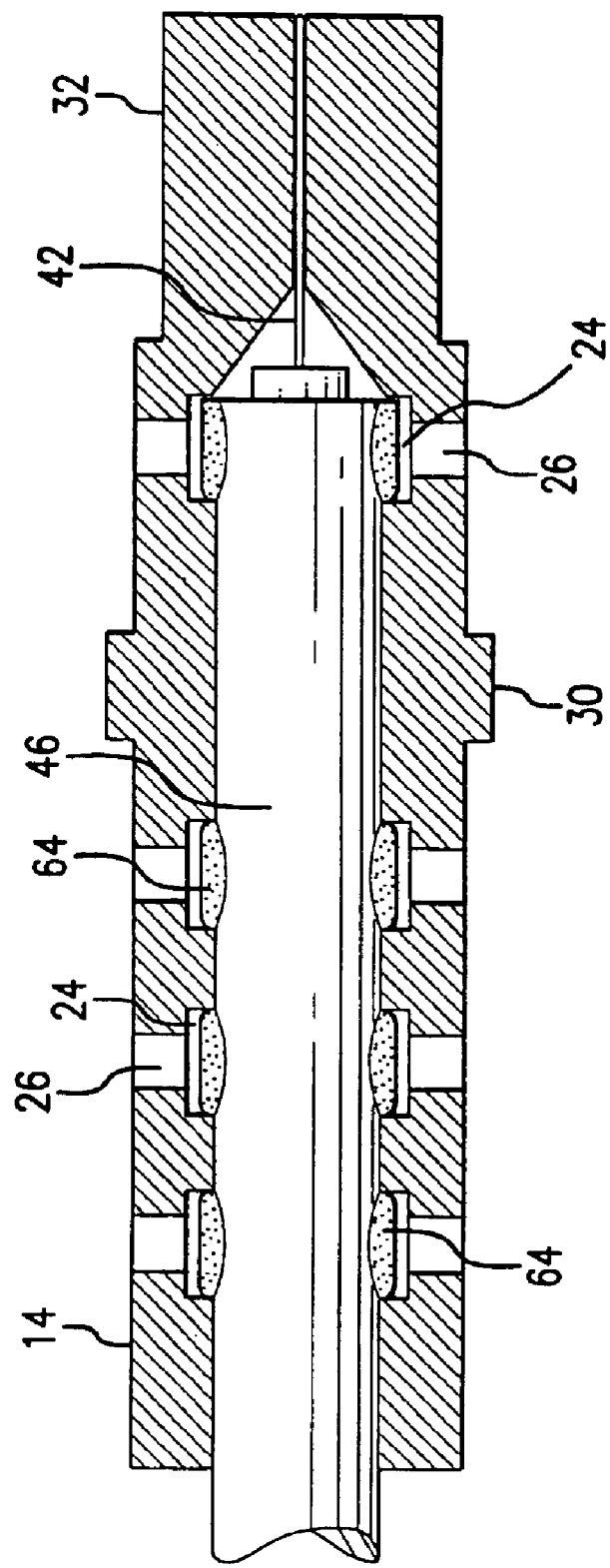
FIG. 3 is a cross-sectional side view of the ferrule with the fiber optic cable after the cable has been laser welded to the ferrule.

The plastic jacket layer or covering of the fiber optic cable is deformable by heat. A laser device 60, generally characterized in FIG. 1, would be chosen specific to the polymer. A working example would be a $CO_2$ laser providing a beam 62 at 808 nanometers (nm). Multiple laser devices could be used to provide simultaneous welding steps. Laser beams are directed through the passages 26 and cavities 24 into contact with the outer jacket or covering 46 of the cable. Segments 64 of the jacket material melt and expand into the cavities, as illustrated in FIG. 3. The cavities provide an increased bonding surface area between the ferrule and cable. In the cavity configuration illustrated in FIG. 5, for example, the material would flow around the edges 56 into the semi-oval shaped elements 54 and fuse with the ferrule material, creating a strong bond between the parts. Also, in the heating area, the layers of the fiber core covering could also fuse, increasing the bond strength between the layers and reducing relative motion between layers due to mechanical stress or thermal cycling. When the laser devices are shut off the material cools and, in interaction with the cavity surfaces, secures the cable end in the ferrule. The ferrule is thereby bonded to the outer jacket without the requirement for an additional layer of weld material. The end of the fiber core can be cut at this point if needed and finished to provide an optical surface. The ferrule can now be received and locked in a female connector or in a sleeve for splicing connection to another fiber.

The ferrule attachment method may be used to apply the ferrule of this invention to a terminal end of a fiber optic cable separated from a longer length cable using the process disclosed in co-pending U.S. patent application Ser. No. 10/658,000, filed Sep. 9, 2003. The entire content of that application is incorporated herein by reference. The fiber optic cable end terminated with the ferrule of this invention may ultimately be used with the fiber optic connector assembly disclosed in co-pending U.S. patent application Ser. No. 10/679,114, filed Oct. 3, 2003, to provide an interface with a fiber optic transceiver.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A ferrule for a fiber optic cable, the ferrule comprising:
   an outer wall and an inner wall, the inner wall defining a hollow interior conduit in the ferrule, the inner wall being shaped and sized to snugly receive an outer jacket layer of a fiber optic cable end;
   multiple cavities recessed within the inner wall in communication with the conduit; and
   a passage extending from each cavity to the outer wall, the cavities having larger cross-sectional areas than the passages.

2. The ferrule of claim 1 wherein there are a plurality of cavities annularly spaced around the inner wall.

3. The ferrule of claim 2 wherein there are sets of cavities spaced along a length of the inner wall.

4. The ferrule of claim 2 wherein the annularly spaced cavities form a four leaf clover configuration.

5. The ferrule of claim 4 wherein clovers of the four leaf clover configuration are connected by rounded edges.

6. The ferrule of claim 2 wherein the cavities include semi-oval shaped elements.

7. The ferrule of claim 6 wherein the annularly spaced semi-oval shaped elements are connected by inclined surfaces joined to short edges extending from the semi-oval shaped elements and parallel to the passages.

8. The ferrule of claim 1 wherein the ferrule has a cable insertion end and an opposite, light-output end.

9. The ferrule of claim 8 further comprising a narrow inner channel adjacent the light-output end sized to receive and align a fiber core of the fiber optic cable extending from the outer jacket layer.

10. The ferrule of claim 9 further comprising an inner conical wall within the ferrule converging from the inner wall to the narrow inner channel.

11. A ferrule for a fiber optic cable comprising:
    a section having an exterior and an interior conduit defined by an inner annular wall, the inner annular wall being sized to receive an outer jacket layer of the fiber optic cable;
    a plurality of cavities recessed within the inner annular wall and open to the conduit and the exterior of the section;
    an additional section with a narrow channel sized to receive a fiber core of the cable extending from the outer jacket layer; and
    a conical wall connected to the inner annular wall and converging to the narrow channel for guiding the core into the channel.

12. The ferrule of claim 11 wherein the cavities are spaced around the inner annular wall.

13. The ferrule of claim 11 wherein the cavities are spaced along the length of the inner annular wall.

14. The ferrule of claim 11 wherein separate passages join each cavity to the exterior of the ferrule, the passages being smaller in cross-sectional area than the cavities.

15. The ferrule of claim 14 wherein the passages extend between recesses in the exterior of the ferrule to the cavities.

16. A method for securing a ferrule to an end of a fiber optic cable comprising the steps of:
    forming the ferrule with at least one cavity facing a hollow interior of the ferrule and a passage extending from the at least one cavity to an exterior of the ferrule, the passage allowing light to pass from outside the ferrule through the cavity to the interior of the ferrule;
    inserting the end of the cable into the ferrule interior such that there is a snug fit between the ferrule and an outer covering surrounding the fiber; and
    using a laser directed through the passage to heat the covering unit it melts and expands into the at least one cavity and bonds with the ferrule.

17. The method of claim 16 wherein the ferrule is formed with multiple cavities and passages.

18. The method of claim 17 wherein a laser is directed through each passage to each cavity to secure the ferrule to the cable end at multiple locations.

* * * * *

UNITED STATES PATENT AND TRADEMARK OFFICE
CERTIFICATE OF CORRECTION

PATENT NO. : 6,902,327 B1 Page 1 of 1
DATED : June 7, 2005
INVENTOR(S) : Johnson It is certified that error appears in the above-identified patent and that said Letters Patent is hereby corrected as shown below:

<u>Column 6,</u>
Line 38, delete "unit" and substitute -- until --.

Signed and Sealed this

Sixteenth Day of August, 2005

JON W. DUDAS
*Director of the United States Patent and Trademark Office*